United States Patent
Yang et al.

(10) Patent No.: US 7,385,448 B2
(45) Date of Patent: Jun. 10, 2008

(54) CIRCUITRY FOR ADAPTIVELY GENERATING AND USING A REFERENCE VOLTAGE

(75) Inventors: Ta-wei Yang, Fremont, CA (US); Larry Farnsley, San Jose, CA (US); Jyn-Bang Shyu, Cupertino, CA (US); Thomas Ching, Newark, CA (US); Robert Olah, Sunnyvale, CA (US)

(73) Assignee: Intelleflex Corporation, San Jose, CA (US)

( * ) Notice: Subject to any disclaimer, the term of this patent is extended or adjusted under 35 U.S.C. 154(b) by 185 days.

(21) Appl. No.: 11/383,943

(22) Filed: May 17, 2006

(65) Prior Publication Data

US 2008/0001667 A1    Jan. 3, 2008

(51) Int. Cl.
*H03F 3/04* (2006.01)

(52) U.S. Cl. .................... 330/250; 330/252
(58) Field of Classification Search ............. 330/250, 330/252, 261, 260, 150, 98, 310
See application file for complete search history.

(56) References Cited

U.S. PATENT DOCUMENTS

| | | | | |
|---|---|---|---|---|
| 3,838,346 A | | 9/1974 | Cox .................... 328/151 |
| 3,898,573 A | | 8/1975 | Sherman .............. 328/167 |
| 3,969,682 A | | 7/1976 | Rossum ................. 330/85 |
| 4,032,857 A | | 6/1977 | Lum .................... 330/151 |
| 4,122,398 A | | 10/1978 | Dunn ................... 330/107 |
| 4,158,818 A | | 6/1979 | Lerner .................. 328/167 |
| 4,578,648 A | * | 3/1986 | Werrbach .............. 330/281 |
| 4,659,995 A | | 4/1987 | Feistel ................. 328/167 |
| 4,724,702 A | * | 2/1988 | Hamren ................. 73/115 |
| 4,727,874 A | * | 3/1988 | Bowers et al. ......... 606/38 |
| 4,758,796 A | * | 7/1988 | Verhoeven et al. ..... 330/84 |
| 4,866,400 A | * | 9/1989 | Britton et al. ......... 330/305 |
| 4,926,139 A | | 5/1990 | Anderson et al. ...... 330/294 |
| 5,001,441 A | | 3/1991 | Gen-Kuong ............ 330/294 |
| 5,138,279 A | | 8/1992 | Kondo et al. .......... 330/294 |
| 5,382,918 A | | 1/1995 | Yamatake .............. 330/260 |
| 5,493,250 A | | 2/1996 | Kasperkovitz et al. .. 327/563 |
| 5,661,435 A | * | 8/1997 | Coleman ............... 330/107 |
| 5,914,633 A | | 6/1999 | Comino et al. ........ 327/553 |
| 6,344,772 B1 | | 2/2002 | Larsson ................. 327/552 |

(Continued)

FOREIGN PATENT DOCUMENTS

EP    0287063    4/1988

*Primary Examiner*—Henry K Choe
(74) *Attorney, Agent, or Firm*—Zilka-Kotab, PC (57) ABSTRACT a circuit for an RFID device in one embodiment includes an operational amplifier having a first input, a second input, and an output where the first input receives an incoming signal, arid the second input is coupled to the output via a feedback loop. An operational amplifier for an RFID device according to another embodiment compares an output of the operational amplifier to an incoming baseband signal, A circuit according to another embodiment includes an operational amplifier having a first input, a second input, and an output, wherein the first input receives an incoming signal, and wherein the second input is coupled to the output via a feedback loop. A comparator having one input is coupled to the output of the operational amplifier, another input receiving the incoming signal, and an output for outputting an outgoing signal. Methods for adjusting a filtering characteristic of an operational amplifier are also disclosed.

20 Claims, 7 Drawing Sheets

U.S. PATENT DOCUMENTS

| | | | |
|---|---|---|---|
| 6,384,684 B1 * | 5/2002 | Redman-White | 330/263 |
| 6,636,107 B2 | 10/2003 | Pelly | 327/552 |
| 6,771,122 B2 * | 8/2004 | Jin et al. | 330/69 |
| 6,788,152 B2 | 9/2004 | Nishizono | 330/308 |
| 6,794,929 B2 | 9/2004 | Pelly | 327/552 |
| 7,271,630 B2 * | 9/2007 | Su | 327/112 |

* cited by examiner

CIRCUITRY FOR ADAPTIVELY GENERATING AND USING A REFERENCE VOLTAGE

FIELD OF THE INVENTION

The present invention relates to Radio Frequency (RF) systems, and more particularly, this invention relates to circuitry for adaptively generating and/or using a reference voltage.

BACKGROUND OF THE INVENTION

Figure 1:
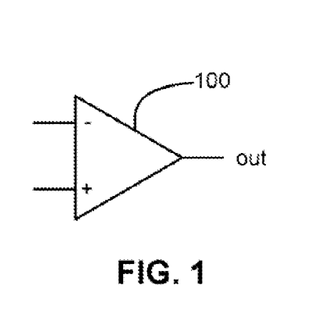
FIG. 1 is a circuit diagram of an operation amplifier.

Operational amplifiers (op amp) and comparators are widely used in integrated circuits because their high gains, two inputs, high input impendence, and many other special characteristics. FIG. 1 shows the most popular symbol for an op amp 100. There are two input terminals: inverting and non-inverting, named by their polarity comparison with the output (out) signal. The op amp compares these two inputs with each other to generate the desired output.

Figure 2:
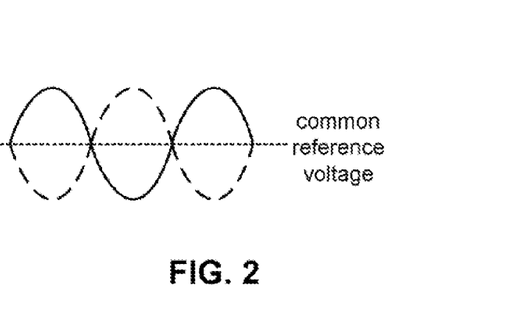
FIG. 2 is a graph illustrating fully differential inputs.

When an op amp or comparator performs comparisons, the references can be specified, or may be hidden in an incoming signal. In FIG. 2, fully differential inputs 200, 202 have a hidden reference, and the reference can be found by averaging both input signals. On the other hand, for single-ended signal, one of the inputs may provide fixed value reference for the other to do the comparison.

Figure 3A:
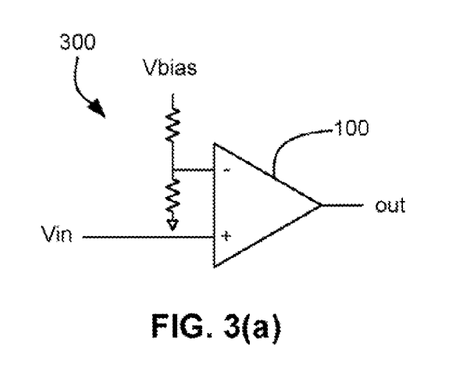
FIGS. 3(a)-(c) are circuit diagrams of circuits having different mechanisms for generating one reference signal for an op amp or comparator.
Figure 3B:
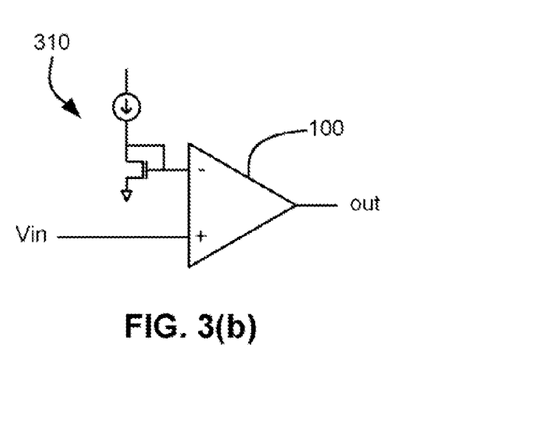
Figure 3C:
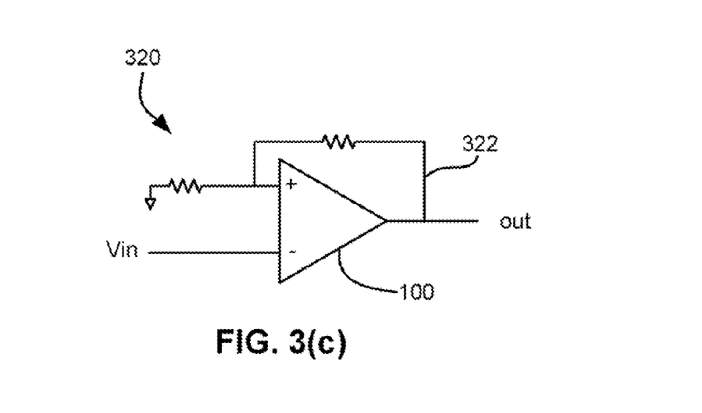

FIG. 3 shows different ways to create one reference signal for an op amp or comparator. For the fixed reference-based circuits 300, 310 shown in FIG. 3(a) and FIG. 3(b). the reference is independent of input signal strength, so these fixed reference structures are not desirable for applications having a large input dynamic range. In the circuit 320 of FIG. 3(c), the op amp or comparator 100 is configured in a closed-loop configuration. Because of the feedback loop 322, the reference is dynamically adjusted by the op amp or comparator output. However, this configuration is not suitable for open loop applications.

Figure 4:
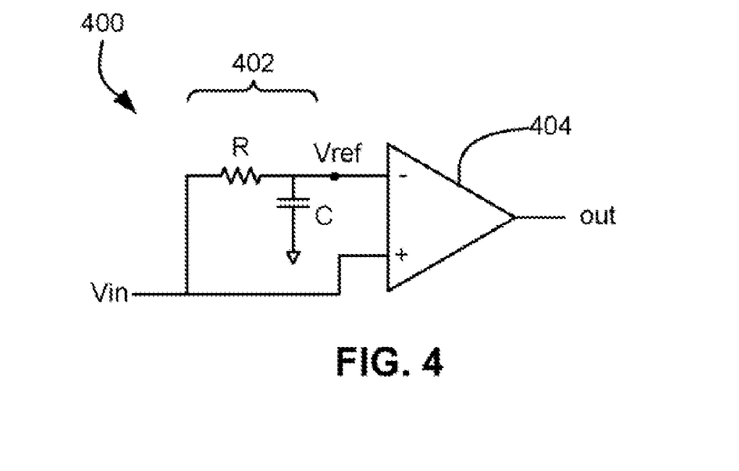
FIG. 4 is a circuit diagram of a circuit m which the input reference to an op amp is set by a low pass filter created by the combination of the resistor arid capacitor.
Figure 5A:
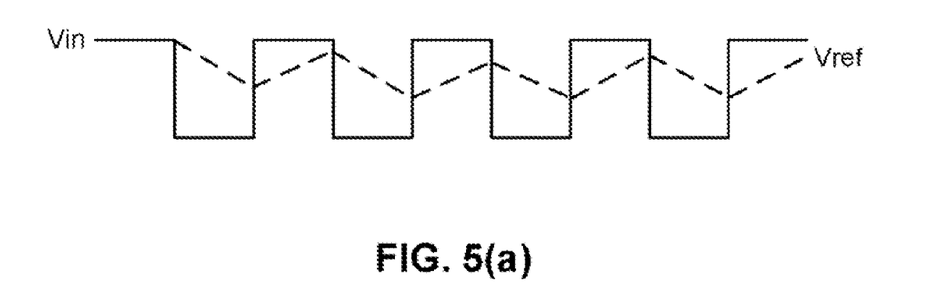
FIGS. 5(a)-(b) are timing waveforms for various data rates showing different settlings of a reference voltage at the output of the low pass filter of FIG. 4.
Figure 5B:
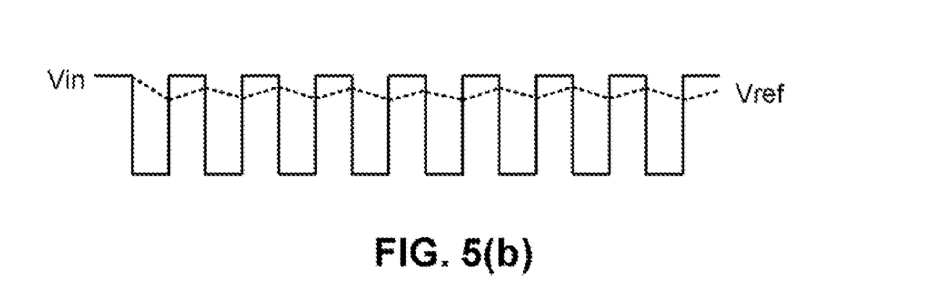

FIG. 4 illustrates a circuit 400 in which the input reference to an op amp 404 is set by a low pass filter 402 created by the combination of the resistor R and capacitor C. The low pass filter filters out signal AC components. The filtered-out AC components are higher frequency than the low pass filter (e.g., −3 dB) corner frequency. The DC level, and lower than low pass filter corner frequency components are retained as a reference voltage Vref for comparing with the original signal Vin. This configuration accommodates a large input dynamic range. However, the low pass filter 402 has a fixed frequency bandwidth, e.g., −3 dB. When the input signal Vin has widely varying data rates, the higher data rate input results in a longer time for the reference signal to settle. The case shown in FIG. 5(a) shows a quick settling because the input frequency is slower than the FIG. 5(b) case. Quicker settling provides an average reference signal level in real time faster, so a comparator or op amp 404 can compare more real reference signal as compared to that of a comparator or op amp using a reference signal having a slow settling time. Furthermore, if the low pass filter has a very low (e.g., −3 dB) corner frequency, the size of the resistor R and capacitor C are very large, which might not be feasible for implementation. However, because of the simplicity and prevalence of resistors and capacitors in filtering, and because most applications have heretofore used a known signal frequency, those skilled in the art have not been motivated to use other filtering schemes.

It would therefore be desirable to achieve faster settling of the reference signal at higher data rates.

SUMMARY OF THE INVENTION

A circuit for a Radio Frequency Identification (RFID) device according to one embodiment includes an operational amplifier having a first input, a second input, and an output, where the first input receives an incoming signal, and where the second input is coupled to the output via a feedback loop.

An operational amplifier for an RFID device according to another embodiment compares an output of the operational amplifier to an incoming baseband signal.

A circuit according to yet another embodiment includes an operational amplifier having a first input, a second input, and an output, wherein the first input receives an incoming signal, and wherein the second input is coupled to the output via a feedback loop. The circuit also includes a comparator having one input coupled to the output of the operational amplifier, another input receiving the incoming signal, and an output for outputting an outgoing signal.

An RFID system includes a plurality of RFID tags and an RFSD interrogator in communication with the RFID tags. Each tag may be coupled to an object, each tag storing information about the object to which coupled. Likewise, each tag may have a unique identifier, the identifier being correlated with information about the object in a database.

A method for adjusting a filtering characteristic of an operational amplifier includes detecting features of an incoming or outgoing signal, determining a time period between the detected features, and adjusting the filtering characteristic of an operational amplifier based on the determined time period between the detected features.

Other aspects and advantages of the present invention on will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 10(*a*) is a circuit diagram illustrating a circuit in which a unit gain connected op amp is used as a low pass filter according to one embodiment of the present invention.

FIG. 10(*b*) is a graph of an exemplary low pass filtering frequency response of the unit gain connected op amp according to one embodiment, of the present invention.

BEST MODE FOR CARRYING OUT THE
INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

The following description discloses various embodiments of a new circuitry scheme that automatically generates an adaptive reference voltage for an amplifier, comparator, data sheer, etc. Some embodiments are suitable for open loop applications.

Many types of devices can take advantage of the embodiments disclosed herein, including but not limited to RFID systems and other wireless devices/systems. To provide a context, and to aid in understanding the various embodiments, much of the present description shall be presented in terms of an RFID system such as that shown in FIG. 6. It should be kept in mind that this is done by way of example only, and the invention is not to be limited to RFID systems, as one skilled in the art will appreciate how to implement the teachings herein into electronics devices in hardware and/or software. In other words, various embodiments can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A computer readable medium can include any medium capable of storing computer code thereon for use by a computer, including optical media such as read only and writeable CD and DVD, magnetic, memory, semiconductor memory (e.g., FLASH memory and other portable memory cards, etc.), etc. Further, such software can be downloadable or otherwise transferable from one computing device to another via network, wireless link, nonvolatile memory device, etc.

A computer for storing and/or executing the code and/or performing the processes described herein can be any type of computing device, including a personal computer (PC), laptop PC, handheld device (e.g., personal digital assistant (PDA)), portable telephone, etc The use of RFID tags are quickly gaining popularity for use in the monitoring and tracking of an item. RFID technology allows a user to remotely store and retrieve data, in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, an item may be tagged at a period when the initial properties of the item are known. For example, this first tagging of the item may correspond with the beginning of the manufacture process, or may occur as an item is first packaged for delivery. Electronically tagging the item allows for subsequent electronic exchanges of information between the tagged item and a user, wherein a user may read information stored within the tag and may additionally write information to the tag. For example, each tag may store information about the object to which coupled. A tagged object can be identified and located by identifying and locating the tag coupled to it.

Figure 6:
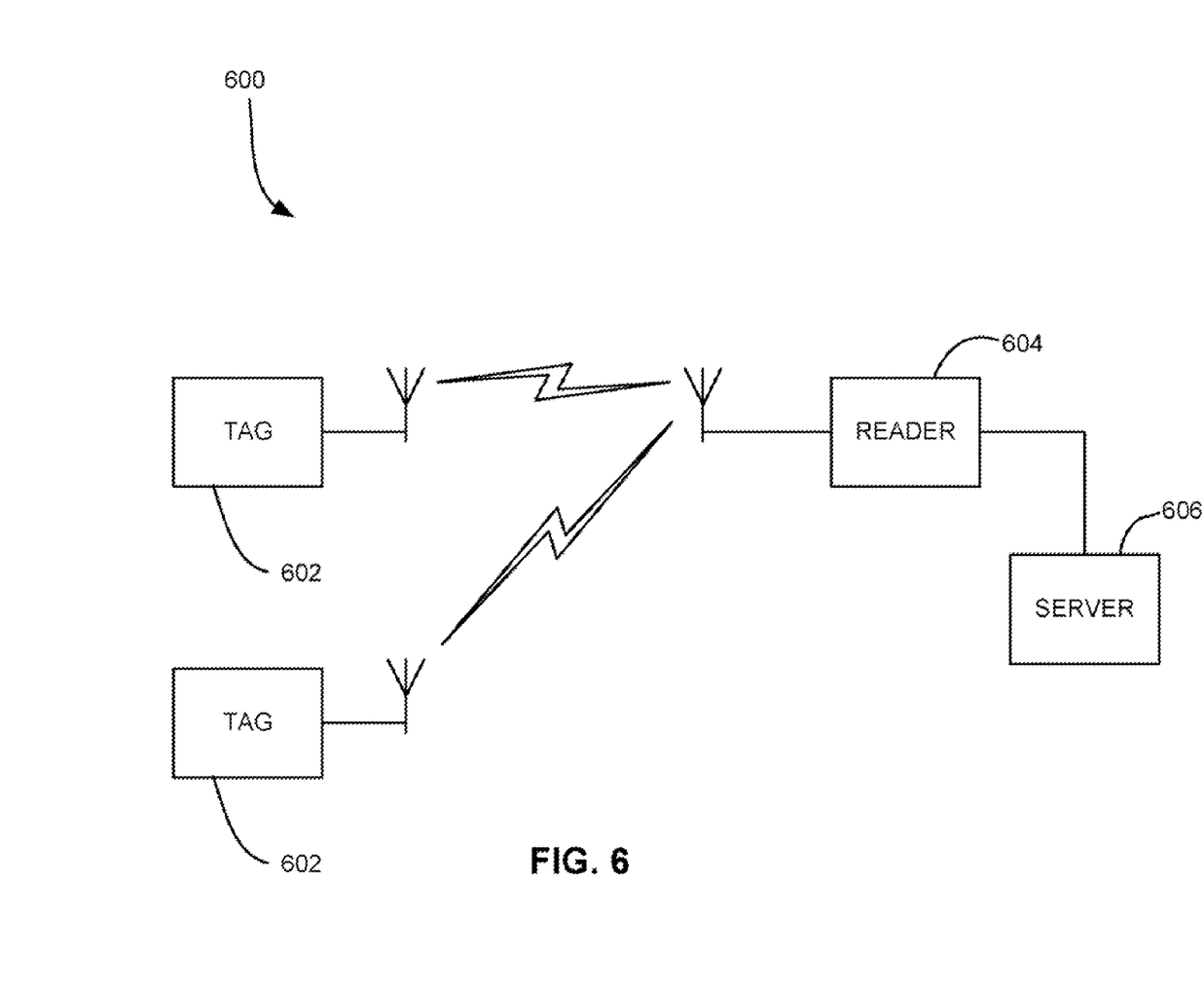
FIG. 6 is a system diagram of an RFID system according to one embodiment, of the present invention.

As shown in FIG. 6, an RFID system 600 typically includes RFID tags 602, an interrogator or "reader" 604, and an optional server 606 or other backend system which may include databases containing information relating to RFID tags and/or tagged items. Each tag 602 may be coupled to an object Each tag 602 includes a chip and an antenna. The chip includes a digital decoder needed to execute the computer commands that the tag 602 receives from the interrogator 604. The chip may also include a power supply circuit to extract and regulate power from the RF interrogator; a detector to decode signals from the interrogator; a backscatter modulator, a transmitter to send data back to the interrogator; anti-collision protocol circuits; and at least enough memory to store its unique identification code, e.g., Electronic Product Code (EPC).

The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN, UCC System Keys, LTD, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each tag 602 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag.

These databases do not reside on the tag, but rather are linked to the tag through a unique identifier(s) or reference key(s).

Communication begins with an interrogator 604 sending out signals via radio wave to find a tag 602. When the radio wave hits the tag 602 and the tag 602 recognizes and responds to the interrogator's signal, the interrogator 604 decodes the data programmed into the tag 602. The information is then passed to a server 606 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 602 to the interrogator 604. Since passive (Class-1 and Class-2) tags get all of their power from the interrogator signal, the tags are only powered when in the beam of the interrogator 604.

The Auto ID Center EPC-Compliant tag classes are set forth below:

Class-1
 Identity tags (RF user programmable, range~3 m)
 Lowest cost
Class-2
 Memory tags (8 bits to 128 Mbits programmable at~3 m range)
 Security & privacy protection
 Low cost
Class-3
 Semi-passive tags (also called semi-active tags)
 Battery tags (256 bits to 64Kb)
 Self-Powered Backscatter (internal clock, sensor interface support)
 ~100 meter range
 Moderate cost
Class-4
 Active tags
 Active transmission (permits tag-speaks-first operating modes)
 ~30,000 meter range
 Higher cost In RFID systems where passive receivers (i.e. Class-1 and Class-2 tags) are able to capture enough energy from the transmitted RF to power the device, no batteries are necessary. In systems where distance prevents powering a device in this manner, an alternative power source must be used. For these "alternate" systems (also known as active or semi-passive), batteries are the most common form of power. This greatly increases read range, and the reliability of tag reads, because the tag does not need power from the interrogator to respond. Class-3 tags only need a 10 mV signal from the interrogator in comparison to the 500 mV that a Class-1 tag needs to operate. This 2,500:1 reduction in power requirement permits Class-3 tags to operate out to a distance of 100 meters or more compared with a Class-1 range of only about 3 meters. Note that semi-passive and active tags may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. High-frequency (850 MHz to 950 MHz and 2.4 GHz to 2.5 GHz) tags offer increased read ranges and high reading speeds. One illustrative application of high frequency tags is automated toll collection on highways and interstates.

Figure 7:
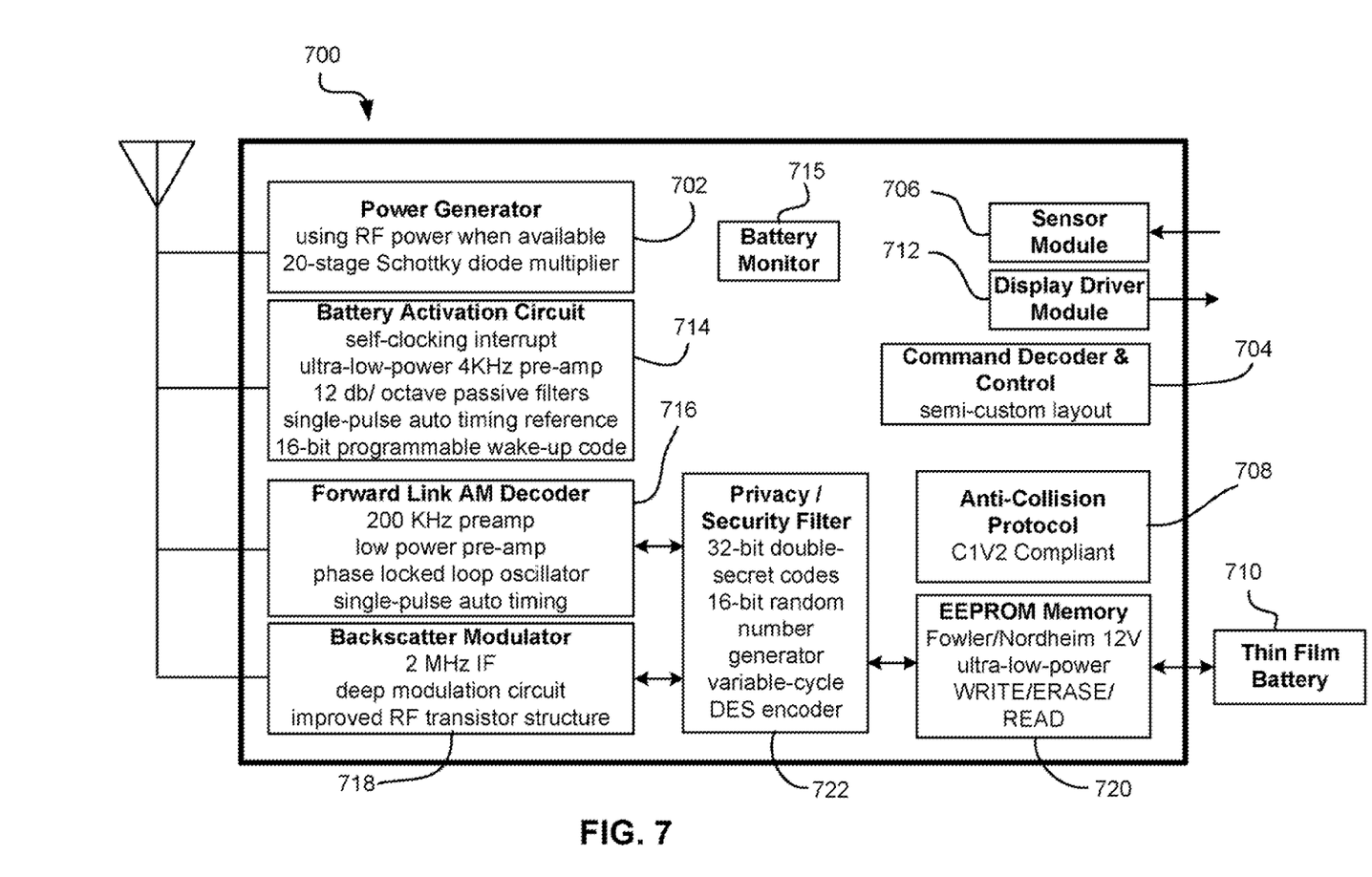
FIG. 7 is a system diagram for an integrated circuit (IC) chip for implementation in an RFID tag according to one embodiment of the present invention.

Embodiments of the present invention are preferably implemented in a Class-3 or higher Class chip. FIG. 7 depicts a circuit layout of a Class-3 chip 700 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 700 includes several industry-standard circuits including a power generation and regulation circuit 702, a digital command decoder and control circuit 704, a sensor interface module 706, a C1V2 interface protocol circuit 708, and a power source (battery) 710. A display driver module 712 can be added to drive a display.

A battery activation circuit 714 is also present to act as a wake-up trigger. In brief, the battery activation circuit 714 includes an ultra-low-power, narrow-bandwidth preamplifier with an ultra low power static current drain. The battery activation circuit 714 also includes a self-clocking interrupt circuit and uses an innovative user-programmable digital wake-up code. The battery activation circuit 714 draws less power during its sleeping state and is much better protected against both accidental and malicious false wake-up trigger events that otherwise would lead to pre-mature exhaustion of the Class-3 tag battery 710.

A battery monitor 715 can be provided to monitor power usage in the device. The information collected can then be used to estimate a useful remaining life of the battery.

A forward link AM decoder 716 uses a simplified phase-lock-loop oscillator that requires an absolute minimum amount of chip area. Preferably, the circuit 716 requires only a minimum string of reference pulses.

A back scatter modulator block 718 preferably increases the backscatter modulation depth to more than 50%.

A memory cell, e.g., EEPROM is also present. In one embodiment, a pure, Fowler-Nordheim direct-tunneling-through-oxide mechanism 720 is present to reduce both the WRITE and ERASE currents to less than 0.1 μA/cell in the EEPROM memory array. Unlike any RFID tags built to date, this will permit designing of tags to operate at maximum range even when WRITE and ERASE operations are being performed.

The module 700 may also incorporate a highly-simplified, yet very effective, security encryption circuit 722. Other security schemes, secret handshakes with interrogators, etc. can be used.

Only four connection pads (not shown) are required for the chip 700 to function: Vdd to the battery, ground, plus two antenna leads to support multi-element omni-directional antennas. Sensors to monitor temperature, shock, tampering, etc can be added by appending an industry-standard 12C interface to the core chip. it should be kept in mind that the present invention can be implemented using any type of tag, and the circuit 700 described above is presented as only one possible implementation.

In RFID communications, the reader generates a signal by amplitude modulating a carrier signal. The tag receives the signal, and demodulates it into a baseband signal using any known method for demodulating an incoming signal into a baseband signal. The baseband signal is then filtered and enhanced to generate a digital signal that can be processed further to reconstruct the data embedded therein.

Figure 8A:
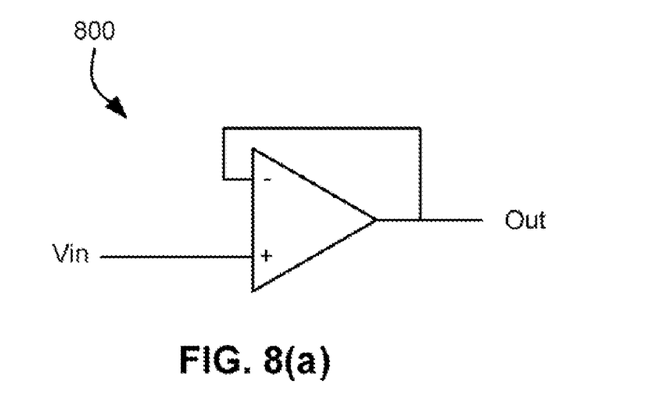
FIG. 8(a) is a circuit, diagram illustrating a circuit for low pass filtering an incoming signal according to one embodiment of the present invention.
Figure 8B:
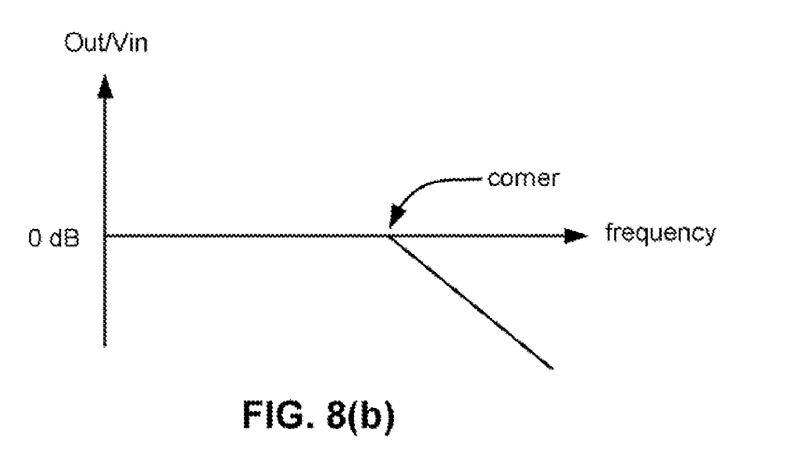
FIG. 8(b) is a graph of an exemplary low pass filtering frequency response of the circuit of FIG. 8(a).

FIG. 8(*a*) illustrates a circuit 800 for low pass filtering an incoming signal Vin As shown, the circuit 800 includes a unit gain configuration of an op amp. The incoming signal Vim is compared to a reference signal, in this case a feedback of the output signal from the unit gain connected op amp 800. FIG. 8(*b*) illustrates an exemplary low pass filtering frequency response of the unit gain connected op amp 800.

Figure 9:
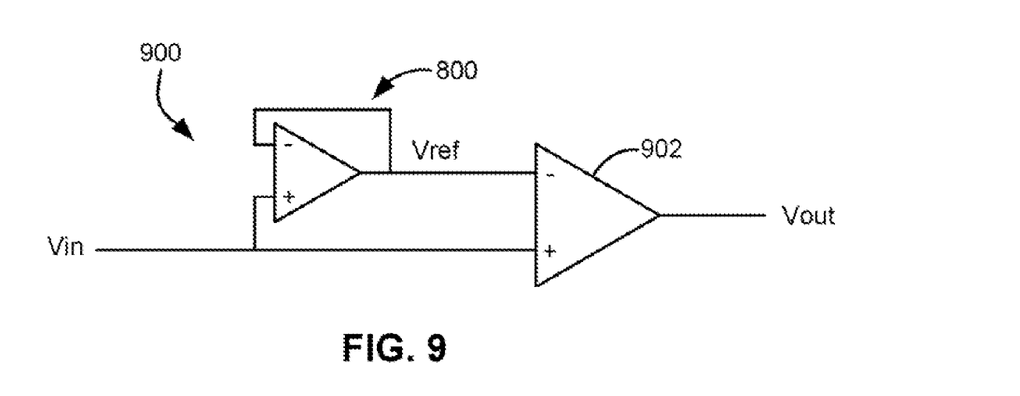
FIG. 9 illustrates implementation of the circuit of FIG. 8(*a*) in a circuit for improving a digital signal according to one embodiment of the present invention.

FIG. 9 illustrates implementation of the unit gain connected op amp 800 in a circuit 900 for improving a digital signal. As shown, the op amp 800 functions as a low pass filter, resulting in a reference signal Vref that is similar to (or is) an average of the high and low levels of the incoming signal Via. The output Vref of the op amp 800 is then compared to the incoming signal Via in a comparator 902 to generate an output Vout that is more like a true digital signal. The outgoing signal Vout of a comparator will be high or low, depending on whether Vet is higher or lower than Vref. Particularly, because Vref is always at some level between the highs and lows of Vint, the comparator 902 output is high or low based on whether Vin is higher or lower than Vref.

In an RFID embodiment, the incoming signal Vin would be an already-demodulated baseband signal. The outgoing signal Vout can be sent for further processing, such as to a Digital Signal Processor (DSP) to recover the data encoded in the incoming signal Vin. Before the reader "talks" to the tag, the signal on the output node of the op amp is typically low. Upon receiving an incoming signal Vin, the node charges up and the feedback loop of the op amp 800 causes the feedback signal of the op amp to follow the output signal higher. The strength of an incoming signal on the tag will depend on various factors, such as the distance between the tag and the reader, the protocol being used, the transmit power of the reader, etc. How high the feedback; signal goes depends on how strong the incoming signal is. Thus, the feedback loop allows the unit gain connected op amp to function as a follower of the signal strength and so is able to adapt to the strength of the incoming signal. Accordingly, one embodiment automatically adapts to the strength of the incoming signal.

Figure 10A:
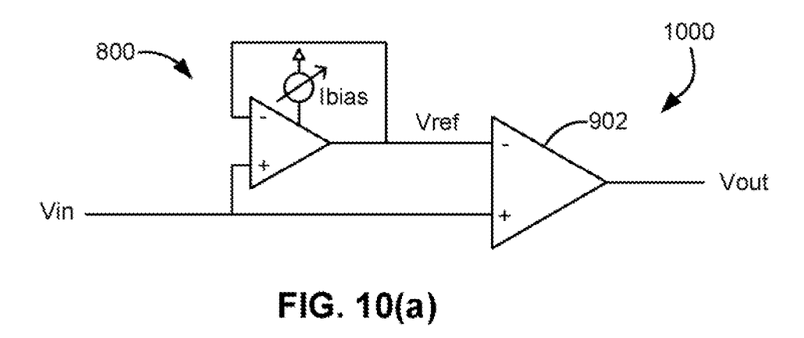
Figure 10B:
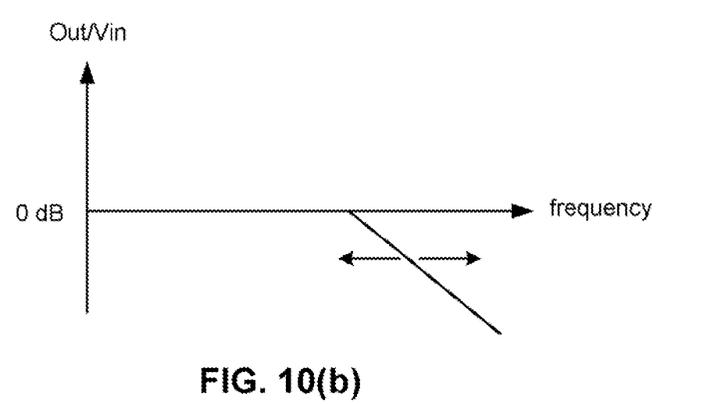

FIG. 10(*a*) depicts another embodiment of a circuit 1000 in which a unit gain connected op amp 800 is used as a low pass filter. In this embodiment, the frequency response of the unit gain connected op amp 800 is proportional to a bias current Ibias applied thereto. That is, the larger the bias current is, the higher the corner frequency the unit gain op amp 800 will have. FIG, 10(*b*) illustrates an exemplary low pass filtering frequency response of the unit gain connected op amp according to one embodiment. Note that by setting the bias current to zero, the circuit 1000 of FIG, 10(*a*) may function like the circuit 900 of FIG. 9.

An automatically adaptive control function may be implemented to control the bias current of the unit gain connected op amp, This automatic control function actually controls the bandwidth of the low pass filter function of the unit gain connected op amp.

Depending on input data rates, it may be desirable to automatically adjust the bias current of the unit gain connected op amp for better settling time. Different frequencies may be used for different data rates, e.g., for different operating modes. For instance, C1 can be as high as 160 Kbits/second, while C3 can be as high as 48 Kbits/second. Similarly, the interrogator may slow communications in order to communicate with a distant tag. Accordingly, the circuit adapts to both the frequency and strength of the incoming signal.

The amount of bias current may be based on the frequency of the incoming or outgoing signals Vin, Vout For example, a bias control circuit may tune the bias current so that if the frequency of the incoming signal Vin or outgoing signal Vout changes, the bias current level is adjusted. For example, if the frequency of Vent increases, more bias current can be sent to the unit gain connected op amp, thereby increasing its bandwidth. Likewise, if the frequency of Vout decreases, less current can be sent to the unit gain connected op amp, thereby decreasing its bandwidth.

Figure 11:
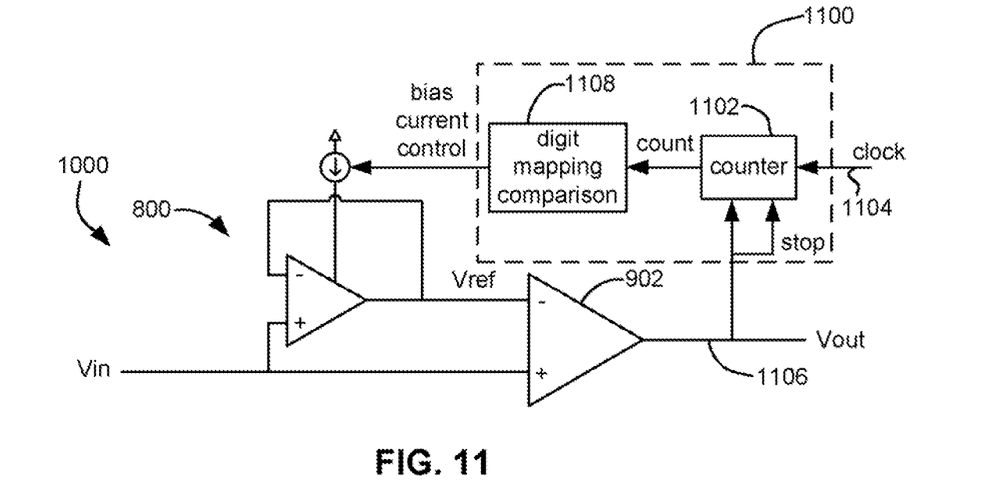
FIG. 11 is a circuit diagram illustrating addition of a bias control circuit to the circuit of FIG. 10(*a*).

As shown in FIG. 11, a bias control circuit 1100 may control the bias current level, preferably based on the data rate of the incoming signal Vin, or the outgoing signal Vout (which will normally be the same as Vin). in one embodiment, a binary code is calculated based on a number of ones and/or zeros found in the outgoing signal Vout when sampled at a given clock rate. Because Vout should be at about the same frequency as the incoming signal Vin, the circuit adapts to the frequency of the incoming signal.

Figure 12:
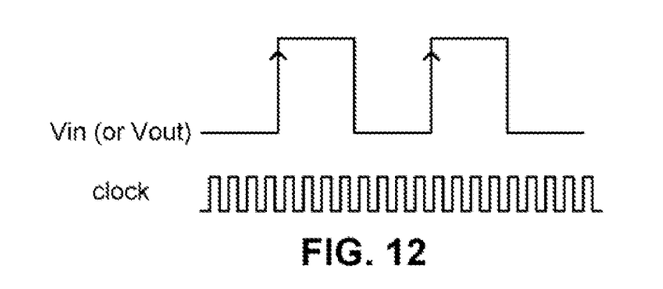
FIG. 12 is a representative diagram illustrating clock cycles relative to a incoming or outgoing signal.

The bias control circuit 1100 according to one embodiment includes a counter 1102 coupled to a clock input line 1104 as well as the outgoing signal Vout line 1106. The clock frequency may be higher than the frequency of the incoming signal Vin or outgoing signal Vout, as represented in FIG. 12. The counter 1102 generates a count based on a number of clock cycles between features of the outgoing signal Vout, such as the rising edges of the outgoing signal waveform. For example, the counter may count the number of clock cycles of a single edge-to-edge period. The circuitry to detect the features of the incoming or outgoing signal and/or for generating a start counting and stop counting signal may be integrated into the counter 1102, may be external thereto, or a combination of the two.

The count is sent to a digit mapping comparison module 1108, which may compare the count to a table, compare the count number to a digital register mapping, calculate a percentage above or below a baseline, etc. The results of the comparison are used to adjust the bias current fed into the unit gain connected op amp. For instance, the data rate of the incoming signal Vin can be determined based on the count, and an optimized preset bias current can be selected for the unit gain connected op amp. Alternatively, the digit mapping comparison module 1108 may select a bias current level based only on the count without calculating the data rate.

Figure 13:
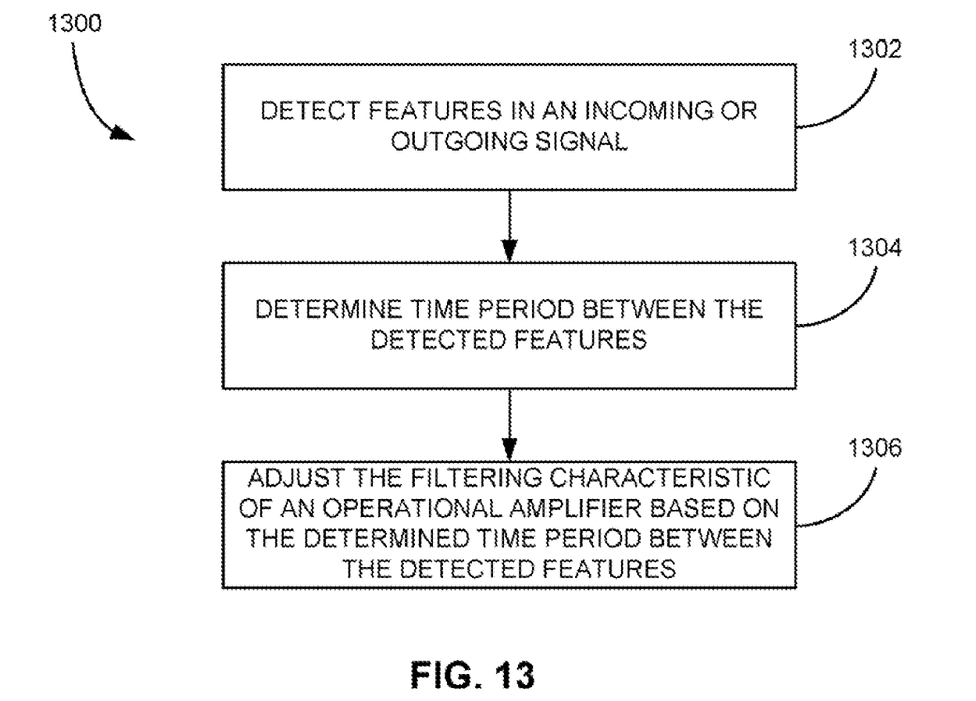
FIG. 13 depicts a method for adjusting a filtering characteristic of an operational amplifier according to one embodiment, of the present invention.

FIG. 13 depicts a method 1300 for adjusting a filtering characteristic of an operational amplifier. In operation 1302, features of an incoming or outgoing signal are detected. In operation 1304, a time period between the detected features is determined, e.g., by generating a count based on a clock signal. In operation 1306, the filtering characteristic of an operational amplifier are adjusted based on the determined time period between the detected features, e.g., by applying a bias current to the operational amplifier.

Variations of the above embodiments are also within the scope of the present invention. For example, the comparator 902 may be replaced with an op amp in some embodiments. Further, other devices may be interposed between the op amp 800 and comparator 902 in other embodiment. Also, as implied in the discussion of FIG. 8, the unit gain connected op amp 800 may be implemented in, or connected to, circuits that do not include a comparator.

One skilled in the art will appreciate how the systems and methods presented herein can be applied to a plethora of scenarios, host systems, venues, and goods.

Accordingly, it should be understood that the systems and methods disclosed herein may be used with objects of any type and quantity in virtually any location.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A circuit for a Radio Frequency Identification (RFID) device, comprising:
   an operational amplifier having a first input, a second input, and an output;
   wherein the first input receives an incoming or outgoing signal,
   wherein the second input is coupled to the output via a feedback loop,
   wherein a filtering characteristic of the operational amplifier is adjusted based on a time period between features of the incoming or outgoing signal.

2. A circuit as recited in claim 1, wherein the circuit functions as a low pass filter.

3. A circuit as recited in claim 2, wherein a bias current is applied to the operational amplifier for adjusting the filtering characteristic of the operational amplifier.

4. A circuit as recited in claim 1, wherein the feedback loop is only coupled to the output and the second input.

5. A circuit as recited in claim 1, wherein the feedback loop is only a conductive path and does not have a resistor.

6. A circuit as recited in claim 1, further comprising a comparator having one input coupled to the output of the operational amplifier, another input receiving the incoming signal, and an outputting an outgoing signal.

7. A circuit as recited in claim 6, wherein the operational amplifier functions as a low pass filter.

8. A circuit as recited in claim 7, wherein a filtering characteristic of the operational amplifier is adjustable.

9. A circuit for a Radio Frequency Identification (RFID) device, comprising:
   an operational amplifier having a first input, a second input, and an output; and
   a comparator having one input coupled to the output of the operational amplifier, another input receiving the incoming signal, and an output for outputting an outgoing signal,
   wherein the operational amplifier functions as a low pass filter,
   wherein a filtering characteristic of the operational amplifier is adjustable,
   wherein the first input receives an incoming signal,
   wherein the second input is coupled to the output via a feedback loop,
   wherein a bias current is applied to the operational amplifier for adjusting the filtering characteristic of the operational amplifier, wherein a level of the bias current is selected based on a frequency of the incoming or outgoing signal.

10. A circuit as recited in claim 9, wherein the frequency of the incoming or outgoing signal is determined at least in part using a signal having a higher frequency than the frequency of the incoming or outgoing signal.

11. A circuit as recited in claim 10, further comprising a counter for generating a count based on a number of clock cycles between features of the incoming or outgoing signal; and a digit mapping comparison module for selecting the level of the bias current based on the count from the counter.

12. A circuit as recited in claim 1, wherein the incoming signal is a baseband signal.

13. An RFID system, comprising:
    a plurality of RFID tags having a circuit as recited in claim 1; and
    an RFID interrogator in communication with the RFID tags.

14. A circuit, comprising:
    an operational amplifier having a first input, a second input, and an output,
    wherein the first input receives an incoming signal, wherein the second input is coupled to the output via a feedback loop; and
    a comparator having one input counted to the output of the operational amplifier, another input receiving the incoming signal, and an output for outputting an outgoing signal,
    wherein the operational amplifier functions as a low pass filter,
    wherein a filtering characteristic of the operational amplifier is adjustable,
    wherein a bias current is applied to the operational amplifier for adjusting the filtering characteristic of the operational amplifier, wherein a level of the bias current is selected based on a frequency of the incoming or outgoing signal.

15. A circuit as recited in claim 14, wherein the frequency of the incoming or outgoing signal is determined at least in part using a clock signal having a higher frequency than the frequency of the incoming or outgoing signal.

16. A circuit as recited in claim 15, further comprising a counter for generating a count based on a number of clock cycles between features of the incoming or outgoing signal; and a digit mapping comparison module for selecting the level of the bias current based on the count from the counter.

17. A method for adjusting a filtering characteristic of an operational amplifier, the method comprising:
    detecting features of an incoming or outgoing signal;
    determining a time period between the detected features; and
    adjusting the filtering characteristic of an operational amplifier based on the determined time period between the detected features.

18. A method as recited in claim 17, wherein determining the time period between the detected features includes generating a count based on a clock signal.

19. A method as recited in claim 17, wherein the filtering characteristics of the operational amplifier are adjusted by applying a bias current to the operational amplifier.

20. An RFID systems, comprising:
    a plurality of RFID rags, each tag performing the method of claim 17; and
    an RFID interrogator in communication with the RFID tags.

* * * * *

UNITED STATES PATENT AND TRADEMARK OFFICE
CERTIFICATE OF CORRECTION

PATENT NO. : 7,385,448 B2
APPLICATION NO. : 11/383943
DATED : June 10, 2008
INVENTOR(S) : Yang et al.

It is certified that error appears in the above-identified patent and that said Letters Patent is hereby corrected as shown below:

On page 1

In the References Cited, section (56):
Add the following references:
--6,356,764 B1 3/2002 Ovard et al. ...... 455/456--
--6,052,001 A 4/2000 Cho et al. ........ 327/103--
--2005/0054293 A1 3/2005 Bann ............... 455/41.3--
--2006/0273900 A1 12/2006 Posamentier ... 340/572.1--
--Copy of International Search Report and Written Opinion from PCT Applicaton no. PCT/US07/11814 mailed 03/12/2008--.

In the Abstract, section (57):
line 1 change "a circuit" to --A circuit--
line 4 change "arid" to --and--
line 7 change "signal , A" to --signal . A--.

In the specification:
col. 1, line 32 change "FIG. 3(b)." to --FIG. 3(b),--
col. 2, line 23 change "RFSD" to --RFID--
col. 2, line 34 change "invention on" to --invention--
col. 2, line 50 change "circuit m" to --circuit in--
col. 2, line 52 change "arid" to --and--
col. 2, line 62 change "circuit, diagram" to --circuit diagram--
col. 2, line 65 change "invention," to --invention.--
col. 3, line 32 change "sheer" to --slicer--
col. 3, line 65 change "etc" to --etc.--
col. 4, line 41 change "LTD" to --UID--
col. 4, line 26 change "object Each" to --object. Each--
col. 5, line 2 change "indentifiers)" to --identifier(s)--
col. 5, line 16 change "ail" to --all--
col. 6, line 54 change "12C" to --I2C--
col. 6, line 55 change "chip. it" to --chip. It--, and start a new paragraph before "It"
col. 7, line 2 change "Vim" to --Vin--
col. 7, line 12 change "Via" to --Vin--
col. 7, line 13 change "Via" to --Vin--
col. 7, line 16 change "Vet" to --Vin--
col. 7, line 18 change "Vint" to --Vin--
col. 7, line 45 change "FIG, 10(b)" to --FIG. 10(b)--
col. 7, line 48 change "FIG, 10(a)" to --FIG. 10(a)--

UNITED STATES PATENT AND TRADEMARK OFFICE
CERTIFICATE OF CORRECTION

PATENT NO. : 7,385,448 B2
APPLICATION NO. : 11/383943
DATED : June 10, 2008
INVENTOR(S) : Yang et al.

It is certified that error appears in the above-identified patent and that said Letters Patent is hereby corrected as shown below:

col. 7, line 52 change "amp," to --amp.--
col. 7, line 66 change "Vout For" to --Vout. For--
col. 8, line 3 change "Vent" to --Vout--
col. 8, line 11 change "in" to --In--.

In the claims:
col. 9, line 29 change "and an outputting" to --and an output for outputting--
col. 9, line 56 change "using a signal" to --using a clock signal--
col. 10, line 16 change "counted" to --coupled--
col. 10, line 54 change "systems" to --system--
col. 10, line 55 change "RFID rags" to --RFID tags--.

Signed and Sealed this

Second Day of December, 2008

JON W. DUDAS
*Director of the United States Patent and Trademark Office*